US007324840B2

(12) United States Patent
Miyazaki et al.

(10) Patent No.: US 7,324,840 B2
(45) Date of Patent: Jan. 29, 2008

(54) SHORT-RANGE AUTOMOBILE WIRELESS COMMUNICATION DEVICE

(75) Inventors: Hideto Miyazaki, Tokyo (JP); Masakazu Togaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 276 days.

(21) Appl. No.: 10/130,986

(22) PCT Filed: Dec. 4, 2000

(86) PCT No.: PCT/JP00/08561

§ 371 (c)(1),
(2), (4) Date: May 24, 2002

(87) PCT Pub. No.: WO02/47201

PCT Pub. Date: Jun. 13, 2002

(65) Prior Publication Data

US 2004/0092230 A1 May 13, 2004

(51) Int. Cl.
*H04M 1/00* (2006.01)
*H04B 7/00* (2006.01)

(52) U.S. Cl. ................. 455/575.9; 455/41.2; 455/41.3; 455/99

(58) Field of Classification Search ............. 455/404.2, 455/575.9, 575.1, 456.1–456.3, 41.2–41.3, 455/90.1–90.3, 95, 96, 99, 569.2, 152.1, 455/297, 345, 347
See application file for complete search history.

(56) References Cited

U.S. PATENT DOCUMENTS 5,263,190 A * 11/1993 Taniguchi et al. .......... 455/297
5,600,333 A 2/1997 Justice et al.
5,603,080 A 2/1997 Kallander et al.
5,918,183 A * 6/1999 Janky et al. ............. 455/456.1
6,052,603 A * 4/2000 Kinzalow et al. ........... 455/557
6,125,326 A * 9/2000 Ohmura et al. ............. 701/213
6,484,040 B1 11/2002 Wang
6,744,823 B1 * 6/2004 Kamemura et al. ......... 375/267

FOREIGN PATENT DOCUMENTS

| | | |
|---|---|---|
| DE | 36 21 990 A | 1/1987 |
| DE | 196 02 657 A1 | 8/1996 |
| DE | 299 12 728 U1 | 10/1999 |
| EP | 0 915 577 A2 | 5/1999 |
| EP | 1 052 834 A2 | 11/2000 |
| JP | 01-132789 | 7/1991 |
| JP | 5-38984 | 2/1993 |
| JP | 06-244617 | 9/1994 |
| JP | 9-84131 | 3/1997 |
| JP | 10-119658 | 5/1998 |
| JP | 10-274925 | 10/1998 |
| JP | 10-276261 | 10/1998 |
| JP | 10-336311 | 12/1998 |
| JP | 11-150762 | 6/1999 |
| JP | 11-331064 | 11/1999 |
| JP | 2001-8274 | 1/2001 |

* cited by examiner

*Primary Examiner*—Matthew Anderson
*Assistant Examiner*—Eugene Yun
(74) *Attorney, Agent, or Firm*—Birch, Stewart, Kolasch & Birch, LLP

(57) ABSTRACT

In a short-range on-vehicle radio communication system having in-car radio communication function, a two-way transmission antenna for radio communication is arranged at a panel portion outside a sheet metal chassis of a car navigation unit. As a result, the communication area becomes large, signals including those from a cellular phone of low radio communication output power are easily received, and it is possible to save manufacturing cost.

11 Claims, 14 Drawing Sheets

11-1: band-pass filter
11-2: band-pass filter
12-1: low-noise amplifier
17: modulation circuit
13: level comparator
15: A/D converter
16: demodulation circuit
12-2: low-noise amplifier
18: D/A converter
19: band-pass filter
20: amplifier

SHORT-RANGE AUTOMOBILE WIRELESS COMMUNICATION DEVICE

This application is the national phase under 35 U.S.C. § 371 of PCT International Application No. PCT/JP00/08561 which has an International filing date of Dec. 4, 2000, which designated the United States of America.

FIELD OF THE INVENTION

The present invention relates to an arrangement of a two-way transmission antenna for radio communication in a short-range on-vehicle radio communication system having in-car radio communication function.

BACKGROUND ART

FIG. 15 is a block diagram of a conventional hands-free system. A cellular phone base station 1 and a cellular phone 2 are connected via a public radio communication line. Signals are transmitted and received between the cellular phone 2 and a hands-free unit 3 via a connector 2C prepared in the cellular phone 2. A microphone 4 and a speaker 5 are connected to the hands-free unit 3. Telephone signals gathered by the microphone 4 arranged in a vehicle are transmitted to the cellular phone base station 1 via the hands-free unit 3 and the cellular phone 2. Then, the telephone signals are transmitted from the cellular phone base station 1 to a person on the other end of a so-called public telephone line. On the other hand, telephone signals from the person on the other end of the line are transmitted to the hands-free unit 3 through the reverse path. The speaker 5 reproduces the telephone signals from the person on the other end of the line inputted to the hands-free unit 3. The cellular phone 2, the hands-free unit 3, the microphone 4 and the speaker 5 are arranged in the vehicle 6.

The hands-free system shown in FIG. 15 has a disadvantage in the aspect that it is necessary to connect the connector 2C of the cellular phone 2 every time a cellular phone user gets on the vehicle. Moreover, it is also necessary to disconnect the connector 2C when the user gets out of the vehicle. Furthermore, when the connector 2C is not connected, the connector 2C with cable should be put away to avoid the car room from looking not neat.

FIG. 16 is a block diagram of another conventional hands-free system, which overcomes the mentioned disadvantage of the hands-free system of FIG. 15. The hands-free system shown in FIG. 16 is disclosed, for example, in the Japanese Patent Publication (unexamined) No. 276261/1998 titled "Radio Communication System". A difference from the hands-free system of FIG. 15 consists in that the, instead of the cable system, the cellular phone 2*a* and the hands-free unit 3*a* are connected by a radio system (or an infrared system). Flow of the telephone signals is the same as in the case of FIG. 15, and further description thereof is omitted herein. In another known system disclosed in the Japanese Patent Publication (unexamined) No. 331064/1999 titled "Hands-free Telephone System", a radio (FM) circuit portion built in the cellular phone 2*a* body is formed into a radio module 7 and is arranged at a connector portion of the cellular phone 2*a*.

The disadvantages of connecting and disconnecting the connector of the cellular phone 2*a* and looking not neat are overcome by using the radio system (or the infrared system) in connecting the cellular phone 2*a* and the hands-free unit 3*a*. In the case of the infrared system, it is necessary that infrared transmitting and receiving sections of the cellular phone 2*a* and the hands-free unit 3*a* are arranged opposite to each other. On the contrary, in the case of the radio system, it is not necessary that the transmitting and receiving sections of the cellular phone 2*a* and the hands-free unit 3*a* are arranged opposite to each other.

As a short-range radio communication system of such type, Bluetooth SIG has proposed a "Bluetooth" system. (BLUETOOTH is a registered trademark of Telefonaktiebolaget L M Ericsson, Sweden.)

The mentioned system has the following characteristics:

(1) Cordless communication between one apparatus and another is achieved.

(2) Radio circuit of this system is applicable to a variety of apparatuses such as personal computers, printers, cellular phones, personal digital assistants, etc.

(3) The global standard is adopted.

(4) Both voice and data communication can be transmitted and received.

(5) A frequency band of 2.4 GHz called an ISM band is adopted.

(6) It is not necessary to arrange the communication apparatuses opposite to each other unlike those in the infrared communication.

(7) Communication between apparatuses is available in the form of not only 1 to 1 like the infrared communication but also 1 to 7 (maximum).

(8) It is possible to choose any output power convenient for each apparatus because there are following three types of outputs:

Class 1: 100 mW (+20 dBm) max;

Class 2: 2.5 mW (+4 dBm) max; and

Class 3: 1 mW (0 dBm) max.

In choosing one output power among the three types described in the foregoing characteristic (8) of the system, Class 3 of the smallest power consumption (i.e., the battery life is long) for a portable device such as cellular phone. It is preferable to adopt Class 1 from the viewpoint of giving an importance to a communication area such as home modem station where communication with each room is available on the power-saving basis.

Supposing that a radio communication is conducted using a cellular phone having a small radio communication output power function like in the foregoing system with a cellular phone brought into a vehicle, it is possible to utilize this radio communication enjoying the following advantages: p0

(1) Hands-free telephone

① Cordless and hands-free telephone is available even when the cellular phone is put in a bag, on a rear seat, or the like.

② This contributes to safe driving.

(2) Information and communication display

① Information provided by an IT-adapted cellular phone of a mobile communication company is displayed on a map display of a car navigation unit. The information is enlarged on the display and easy to see.

② Plural persons in the vehicle can see the display at the same time.

③ This contributes to safe driving.

Now, environment of the radio communication is described below.

(1) A power-saving type is adopted as the radio output power of the cellular phone in most cases.

① In the case of power-saving output power, it is considered that communication is available within a distance of several meters.

(2) In the cases of the foregoing hands-free telephone (1) and information and communication display (2), a radio communication circuit is built in a car navigation unit in most cases.

① As the car navigation unit is composed of a sheet metal chassis, a radio communication antenna is arranged inside the sheet metal chassis of the car navigation unit, and therefore sensitivity is low.

② The car navigation unit is arranged at any of various places such as center console, under side of seat, and trunk.

③ In the case of arranging the car navigation unit in the trunk, to be free from outside influence such as "pressure", "waterdrop", and the like from loaded cargo, the unit incorporating the communication antenna of the car navigation may be further covered with a sheet metal when required.

Accordingly, an object of the invention is to provide a short-range on-vehicle radio communication system having in-car radio communication function, capable of widening the communication area so that any signal from a cellular phone of low radio communication output power as described above may be easily received.

DISCLOSURE OF INVENTION

The invention provides a short-range on-vehicle radio communication system having an in-car radio communication function, in which a two-way transmission antenna for radio communication is arranged outside a sheet metal chassis of a main body. As a result of employing such an arrangement, communication area becomes larger and any signal from a cellular phone of low radio communication output power might be easily received.

The invention is applied to a car navigation unit, and the two-way transmission antenna for radio communication is arranged at a panel portion outside the sheet metal chassis of the car navigation unit. As a result of employing such an arrangement, communication area becomes broader, any signal from a cellular phone of low radio communication output power might be easily received, and it is further possible to save the manufacturing cost.

The invention provides the short-range on-vehicle radio communication system having in-car radio communication function, in which the two-way transmission antenna for radio communication is arranged outside the main body. As a result of employing such an arrangement, a stable and large communication area is secured irrespective of the place of locating the short-range on-vehicle radio communication system main body, and any signal from a cellular phone of low radio communication output power might be easily received.

The invention provides the system of the short-range radio communication of which radio communication output power is small, which is applied to the car navigation unit. As a result of employing such an arrangement, the problem of communication antenna being low in sensitivity is solved, and any signal from a cellular phone of low radio communication output power of several meters in communication available distance is might be easily received.

The invention provides the short-range on-vehicle radio communication system having in-car radio communication function, in which the two-way transmission antenna for radio communication is arranged at a ceiling in a car room. As a result of employing such an arrangement, influence due to the place where the person to communicate to (i.e., the cellular phone) is located in the car room, is less. Furthermore, difference in distance between each place where the main body of the short-range on-vehicle radio communication system is located in the vehicle and the two-way transmission antenna for radio communication is reduced, and therefore fluctuation in loss caused by cable length is restrained.

The invention provides the short-range on-vehicle radio communication system having in-car radio communication function, in which the two-way transmission antenna for radio communication is arranged in an interior light module on the ceiling in the car room, on a surface of the module, or around the module. As a result of employing such an arrangement, the two-way transmission antenna for radio communication is out of sight, and wiring can be performed together with wiring for the interior light. The antenna can be arranged on the ceiling together with the interior light module. Further, the influence due to the place where the person to communicate to (i.e., the cellular phone) is located in the car room is reduced. Difference in distance between each place where the main body of the short-range on-vehicle radio communication system is arranged in the vehicle and the two-way transmission antenna for radio communication is less, and therefore fluctuation in loss caused by the cable length is restrained.

The invention provides the short-range on-vehicle radio communication system having in-car radio communication function, in which the two-way transmission antenna for radio communication is arranged on the front seat side. As a result of employing such an arrangement, the two-way transmission antenna for radio communication is located in the vicinity of the cellular phone brought into the vehicle by a driver who uses the hands-free telephone in most cases, which increases reliability in transmitting and receiving through the radio communication.

The invention provides the short-range on-vehicle radio communication system having in-car radio communication function, in which the two-way transmission antenna for radio communication is arranged on an outer circumference of the main body. As a result of employing such an arrangement, the antenna cable is shortened and loss due to cable length is less. Further the antenna mounting work becomes easy.

The invention provides the short-range on-vehicle radio communication system having in-car radio communication function, in which plural two-way transmission antennas for radio communication are arranged outside the sheet metal chassis of the main body in the vehicle. As a result of employing such an arrangement, the communication-available area becomes highly reliable, which enables development for large-sized vehicles such as buses.

The invention provides the short-range on-vehicle radio communication system having in-car radio communication function, in which among the plural two-way transmission antennas for radio communication, one is arranged at a front portion inside the vehicle and another one is arranged at a rear portion inside the vehicle.

The invention provides the short-range on-vehicle radio communication system having in-car radio communication function, in which among the plural two-way transmission antennas for radio communication, one is arranged at a panel portion outside the sheet metal chassis and another one is arranged outside the main body.

Furthermore, the invention provides the short-range on-vehicle radio communication system having in-car radio communication function, in which an antenna output of the highest reception level is selected among the plural two-way transmission antennas for radio communication. As a result of employing such an arrangement, when the person to communicate to uses a communication apparatus of small communication output power, the communication is secured even when the person to communicate to moves. This enables development for large-sized vehicles such as buses.

BEST MODE FOR CARRYING OUT THE INVENTION

In the case of performing a radio communication between a cellular phone and an on-vehicle radio communication system (a car navigation unit), a power-saving type output power is adopted as the radio output power of the cellular phone in most cases.

On the other hand, the on-vehicle radio communication system (the car navigation unit) is covered with a sheet metal chassis except for a panel face.

Embodiment 1.

Figure 1:
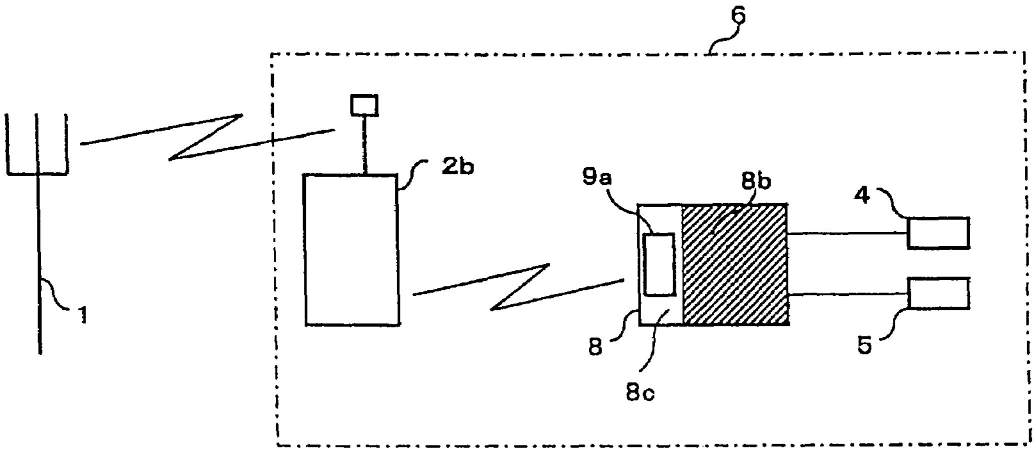
FIG. 1 is a schematic diagram showing an arrangement according to Embodiment 1 of the invention.

Taking account of the foregoing conditions, Embodiment 1 of the invention is hereinafter described with reference to FIG. 1. FIG. 1 is a schematic diagram showing an arrangement according to Embodiment 1 of the invention. It is supposed herein that a short-range radio communication is performed between a cellular phone 2*b* and a car navigation unit 8 (a short-range on-vehicle radio communication system) each having short-range radio communication function. In this case, if a two-way transmission antenna 9*a* for short-range radio communication in the can navigation unit 8 is arranged inside a sheet metal chassis portion 8*b*, radiation pattern characteristic of the two-way transmission antenna 9*a* for radio communication is restricted, and an area where communication is available becomes narrow. In order to relax the restriction on the radiation pattern characteristic of the two-way transmission antenna 9*a* for radio communication, the two-way transmission antenna 9*a* for radio communication is arranged outside the sheet metal chassis portion 8*b* of the can navigation unit 8, i.e., at a panel portion 8*c*.

As a result, the communication area becomes large, and this improves reception of signals including those from the cellular phone 2*b* of low short-range radio communication output power. It is possible to save the manufacturing cost by arranging the two-way transmission antenna 9*a* for radio communication at the panel portion 8*c* outside the sheet metal chassis portion 8*b* of the car navigation unit 8.

The car navigation unit 8 has hands-free function, and to which the microphone 4 and the speaker 5 is connected. The cellular phone 2*b*, the car navigation unit 8, the microphone 4, and the speaker 5 are all located in the vehicle 6. Telephone signals gathered by the microphone 4 arranged in the vehicle 6 are transmitted to the cellular phone base station 1 via the car navigation unit 8 and the cellular phone 2*b*. On the other hand, telephone signals from the person on the other end of the line are transmitted to the car navigation unit 8 through the reverse path. The speaker 5 reproduces telephone signals of the person on the other end of the line inputted to the car navigation unit 8. It is a matter of course that the system shown in FIG. 1 is also applicable to a case of displaying data other than the telephone signals from the cellular phone 2*b* on the map display (not shown) for the car navigation unit 8, and to a case of transmitting data other than the telephone signals from the car navigation unit 8 to the cellular phone 2*b*.

Embodiment 2.

Figure 2:
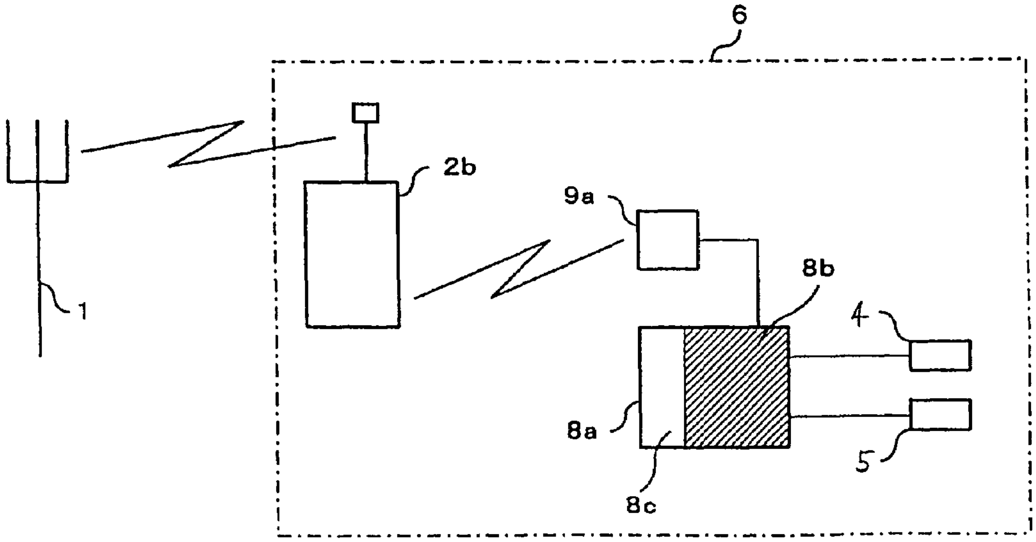
FIG. 2 is a schematic diagram showing an arrangement according to Embodiment 2 of the invention.

FIG. 2 is a schematic diagram showing an arrangement according to Embodiment 2 of the invention. In this Embodiment 2, the two-way transmission antenna 9*a* for short-range radio communication of the can navigation unit 8*a* is arranged outside the car navigation unit 8*a*. This two-way transmission antenna 9*a* for short-range radio communication is covered with a resin case or the like that does not restrict the radiation pattern characteristic of the antenna 9*a*.

As a result of employing such arrangement, it is obvious that the communication area is not restricted by the sheet metal chassis 8*b* and the short-range radio communication environment is further improved. Furthermore even in the case that the car navigation unit 8*a* is arranged at a place where the radio environment is not desirable, it is possible to achieve a favorable short-range radio communication with the cellular phone 2*b*. Particularly in the case that the car navigation unit 8*a* is arranged in the trunk, or even in the case that the unit 8*a* is covered with a protective sheet metal for protection from "external pressure" "water drop", arranging the two-way transmission antenna for short-range radio communication outside the car navigation unit 8*a* makes it possible to stably secure the communication-available area irrespective of the place where the car navigation unit 8*a* main body is arranged.

Embodiment 3.

Figure 3:
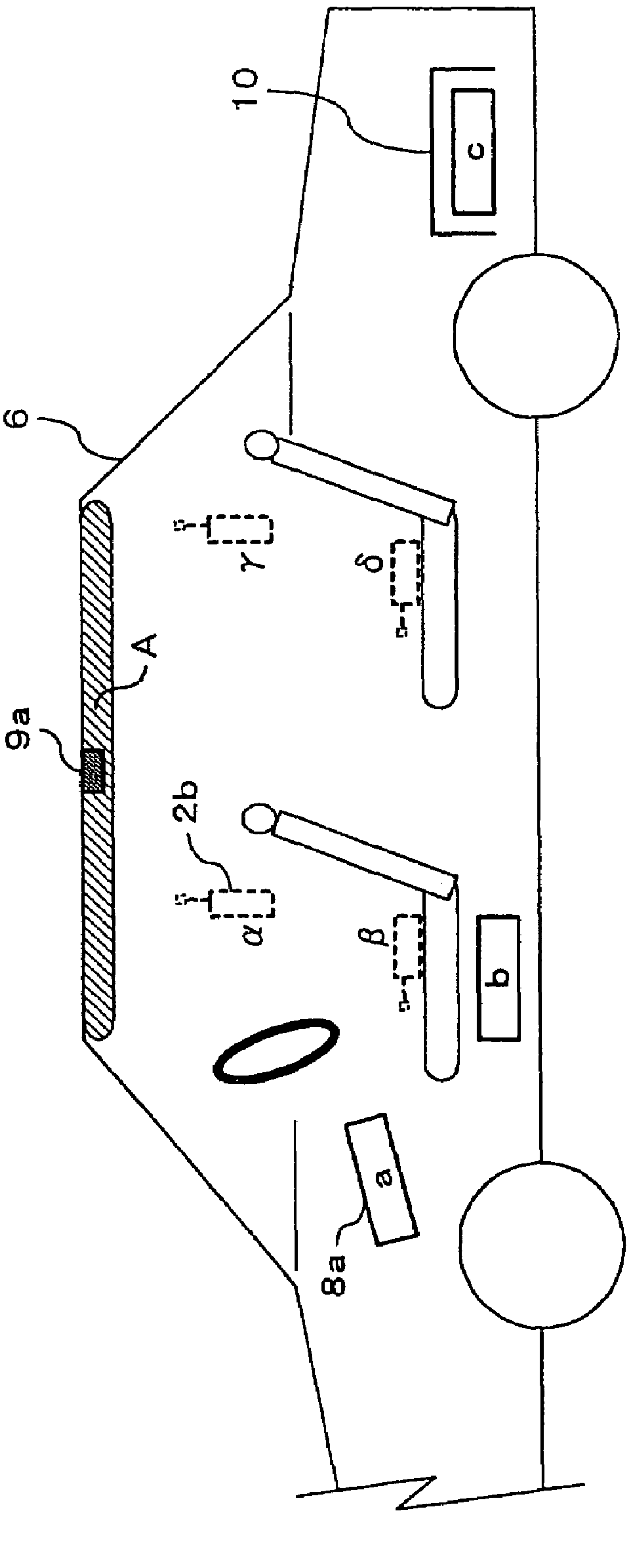
FIG. 3 is a schematic view showing an arrangement according to Embodiment 3 of the invention.

FIG. 3 is a schematic view showing an arrangement according to Embodiment 3 of the invention. FIG. 3 shows Example 1 of the aspect of arranging the two-way transmission antenna 9*a* for short-range radio communication of the car navigation unit 8*a* outside the car navigation unit 8*a*. In this Example 1 showing the aspect of arranging the two-way transmission antenna 9*a* for short-range radio communication, the antenna 9*a* is arranged at the ceiling in the car room (Place A). As a result, the radio environment between the two-way transmission antenna 9*a* for short-range radio communication and the cellular phone 2*b* located at any of points α, β, γ, and δ in the car room is good in the same manner. Influence due to the place of the person to talk to (i.e., place of the cellular phone) in the car room is minimum.

In the case that the car navigation unit 8*a* is arranged at any of the points a, b, and c in the vehicle, the distance between the two-way transmission antenna 9*a* for short-range radio communication and the car navigation unit 8*a* is almost equal, and fluctuation in loss caused by a cable length is restrained. Furthermore, even in the case that the car navigation unit 8*a* is arranged in the trunk and the unit is covered with a protective sheet metal 10 for protection from "external pressure" "water drop", it is possible to keep radio environment good between the two-way transmission antenna 9*a* for short-range radio communication and the cellular phone 2*b*.

Embodiment 4.

Figure 4:
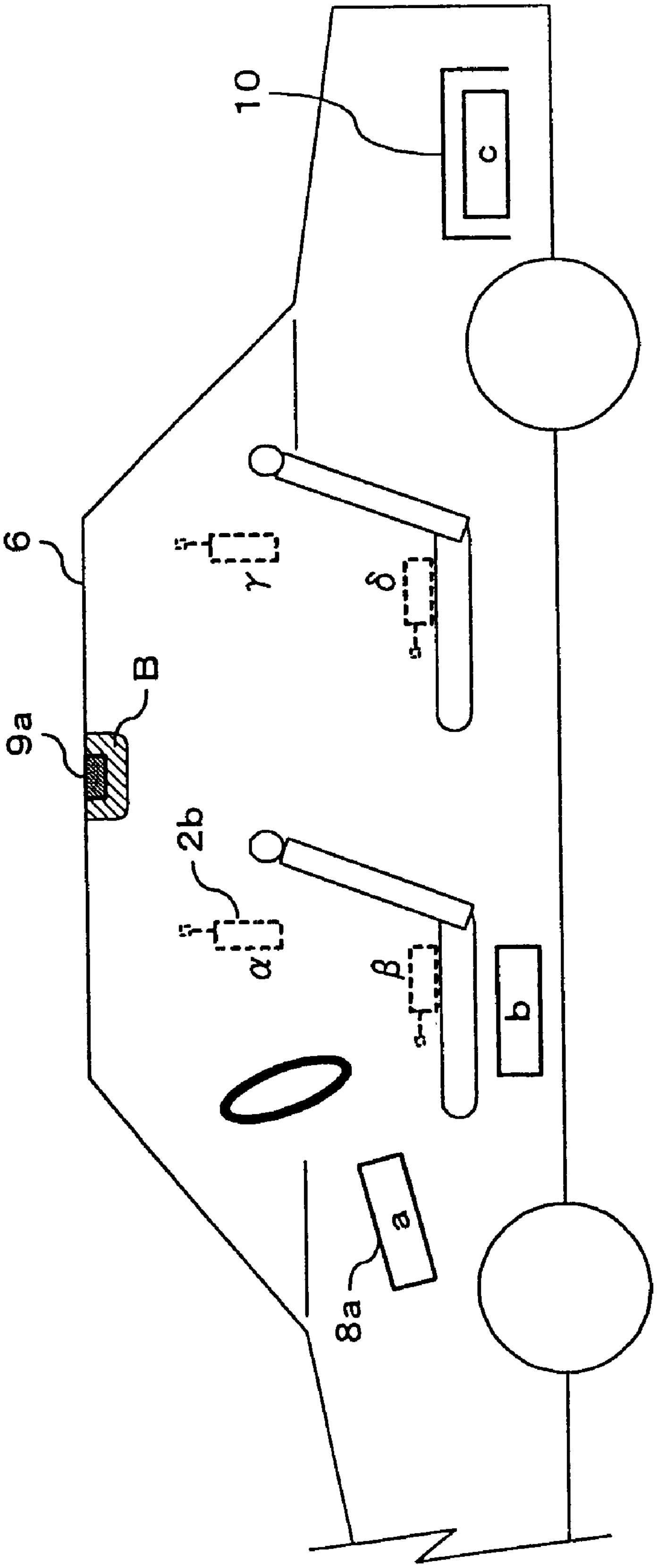
FIG. 4 is a schematic view showing an arrangement according to Embodiment 4 of the invention.

FIG. 4 is a schematic view showing an arrangement according to Embodiment 4 of the invention. FIG. 4 shows Example 2 of the aspect of arranging the two-way transmission antenna 9*a* for short-range radio communication of the car navigation unit 8*a* outside the car navigation unit 8*a*. In this Example 2 showing the aspect of arranging the two-way transmission antenna 9*a* for short-range radio communication is arranged, the antenna 9*a* is arranged in an interior light module (Place B) in the car room, on a surface of the module or around the module. As a result, the following advantages are obtained in addition to those described in Embodiment 3.

First, in the case of arranging the two-way transmission antenna 9*a* for short-range radio communication in the interior light module, the two-way transmission antenna 9*a* for short-range radio communication is out of sight, and the car room looks very neat. Furthermore, the two-way transmission antenna 9*a* for short-range radio communication is wired together with wiring of the interior light module, thereby work efficiency being improved.

In the case of arranging the two-way transmission antenna 9*a* for short-range radio communication on the surface of the interior light module or in the vicinity thereof, not only the two-way transmission antenna 9*a* for short-range radio communication is wired together with wiring of the interior light module, but also the two-way transmission antenna 9*a* for short-range radio communication and the interior light module can be installed at the same time, thereby work efficiency being improved.

In the foregoing description, the antenna is arranged in the interior light module in the car room, on the surface of the module or around the module. The same advantages as in the interior light module are also obtained by arranging the two-way transmission antenna 9*a* for short-range radio communication integrally with a rearview mirror (room mirror) in the car room or by arranging the two-way transmission antenna 9*a* for short-range radio communication around the rearview mirror.

In other words, in the case that the antenna 9*a* is arranged integrally with the rearview mirror (room mirror), the car room looks neat. In the case that the antenna 9*a* is arranged around the rearview mirror (room mirror), a mounting member for mounting the rearview mirror (room mirror) and a mounting member for mounting the two-way transmission antenna. 9*a* for short-range radio communication can be combined, and the rearview mirror (room mirror) and the two-way transmission antenna 9*a* for short-range radio communication can be arranged at the same time, thereby work efficiency being improved.

Embodiment 5.

Figure 5:
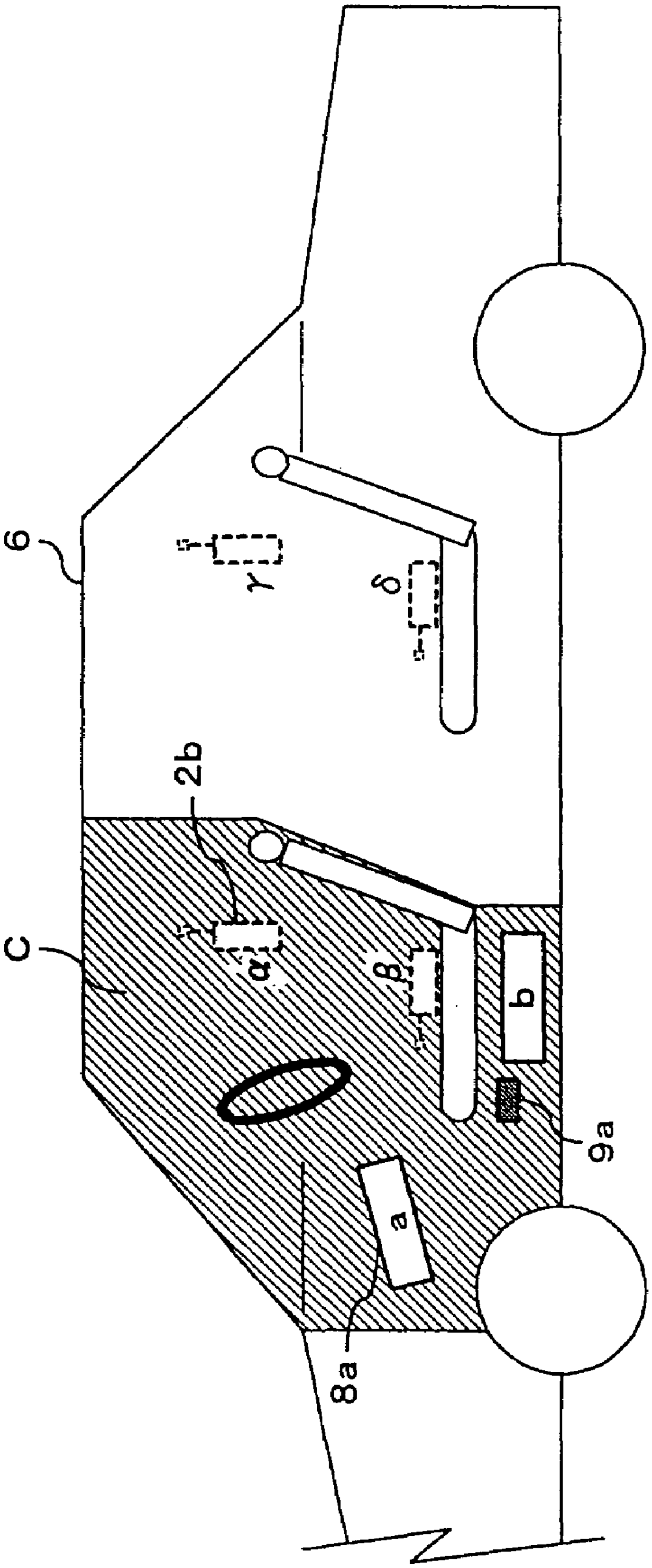
FIG. 5 is a schematic view showing an arrangement according to Embodiment 5 of the invention.

FIG. 5 is a schematic view showing an arrangement according to Embodiment 5 of the invention. FIG. 5 shows Example 3 of the aspect of arranging the two-way transmission antenna 9*a* for short-range radio communication of the car navigation unit 8*a* outside the car navigation unit 8*a*. In this Example 3 showing the aspect of arranging the two-way transmission antenna 9*a* for short-range radio communication, the antenna 9*a* is arranged on the front seat side in the car room (Place C: the two-way transmission antenna 9*a* for short-range radio communication is arranged under the assistant driver's seat in FIG. 5). As a result, there is a possibility that the antenna 9*a* is located in the vicinity of the cellular phone brought into the vehicle by the driver who is supposed to use the mentioned hands-free telephone in most cases, thereby reliability on transmitting and receiving in radio communication being improved.

Embodiment 6.

Figure 6:
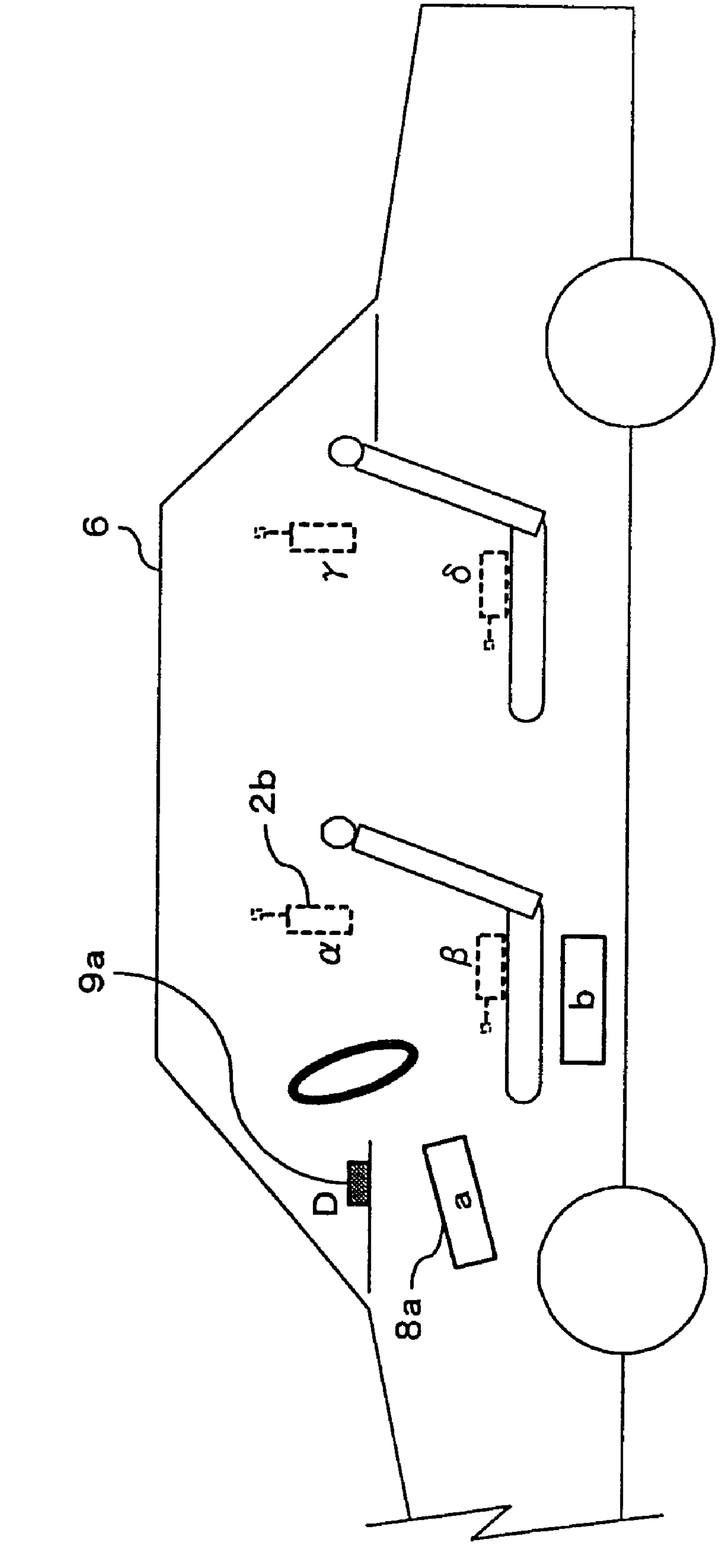
FIG. 6 and FIG. 7 are a schematic view and a perspective view respectively showing an arrangement according to Embodiment 6 of the invention.
Figure 7:
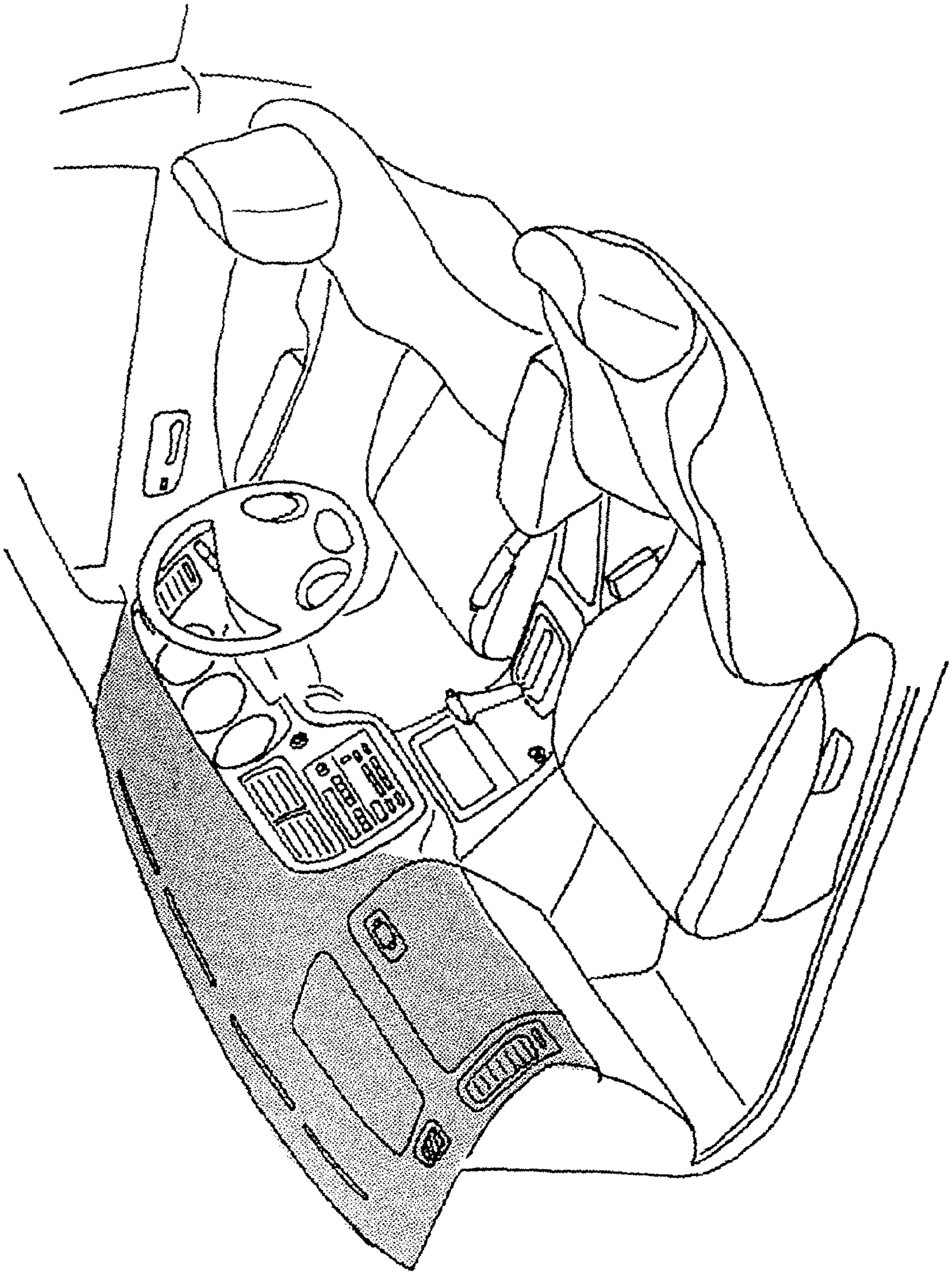

FIG. 6 is a schematic view showing an arrangement according to Embodiment 6 of the invention. FIG. 6 shows Example 4 of the aspect of arranging the two-way transmission antenna 9*a* for short-range radio communication of the car navigation unit 8*a* outside the car navigation unit 8*a*. In this Example 4 showing the aspect of arranging the two-way transmission antenna 9*a* for short-range radio, the antenna 9*a* is arranged on a surface of a dashboard in the car room, inside the dashboard or around the dashboard (Place D). The portion indicated by the half-tone dot meshing in FIG. 7 shows the Place D in an image of actual vehicle.

As a result, in the case that the car navigation unit 8*a* is arranged either at a point a (center console) or at a point b (under the front seat) in the vehicle, the distance between the two-way transmission antenna 9*a* for short-range radio communication and the car navigation unit 8*a* is shorter than that in the foregoing Embodiment 3 or 4, and loss caused by the cable length is reduced. Further, mounting the two-way transmission antenna 9*a* for short-range radio communication is easier than that in the foregoing Embodiment 3 or 4.

Furthermore, arranging the cellular phone 2*b* either at the point γ or at the point δ in the car room does not cause any significant deterioration in radio environment between the two-way transmission antenna 9*a* for short-range radio communication and the cellular phone 2*b*.

Embodiment 7.

Figure 8:
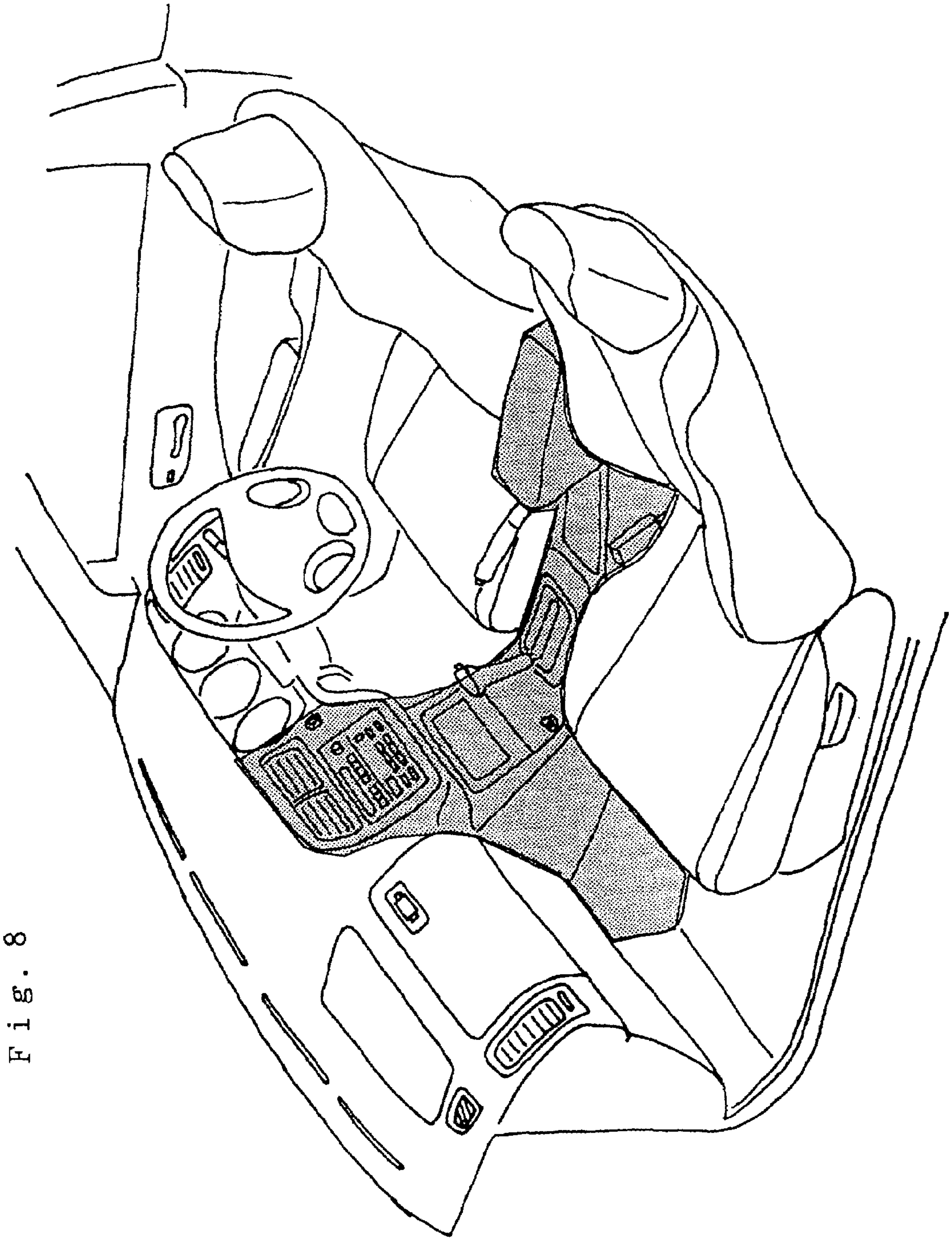
FIG. 8 is a perspective view showing an arrangement according to Embodiment 7 of the invention.

FIG. 8 is a perspective view showing an arrangement according to Embodiment 7 of the invention. FIG. 8 shows Example 5 of the aspect of arranging the two-way transmission antenna 9*a* for short-range radio communication of the car navigation unit 8*a* outside the car navigation unit 8*a*. In this Example 5 showing the aspect of arranging the two-way transmission antenna 9*a* for short-range radio communication, the antenna 9*a* is arranged on a surface of the center console or floor console (the portion indicated by half-tone dot meshing in FIG. 8) in the car room, inside the console or around the console. As a result, there is a possibility that the antenna 9*a* is located in the vicinity of the cellular phone brought into the vehicle by the driver who is supposed to use the mentioned hands-free telephone in most cases, thereby reliability on transmitting and receiving in radio communication being improved.

Consequently, in the case that the car navigation unit 8*a* is arranged either at a point a (center console) or at a point b (under the front seat) in the vehicle, particularly at the point a (the center console), the distance between the two-way transmission antenna 9*a* for short-range radio communication and the car navigation unit 8*a* is shorter than that in the foregoing Embodiment 3 or 4, and loss caused by the cable length is reduced. Further, mounting the two-way transmission antenna 9*a* for short-range radio communication is easier than in the foregoing Embodiment 3 or 4.

Embodiment 8.

Figure 9:
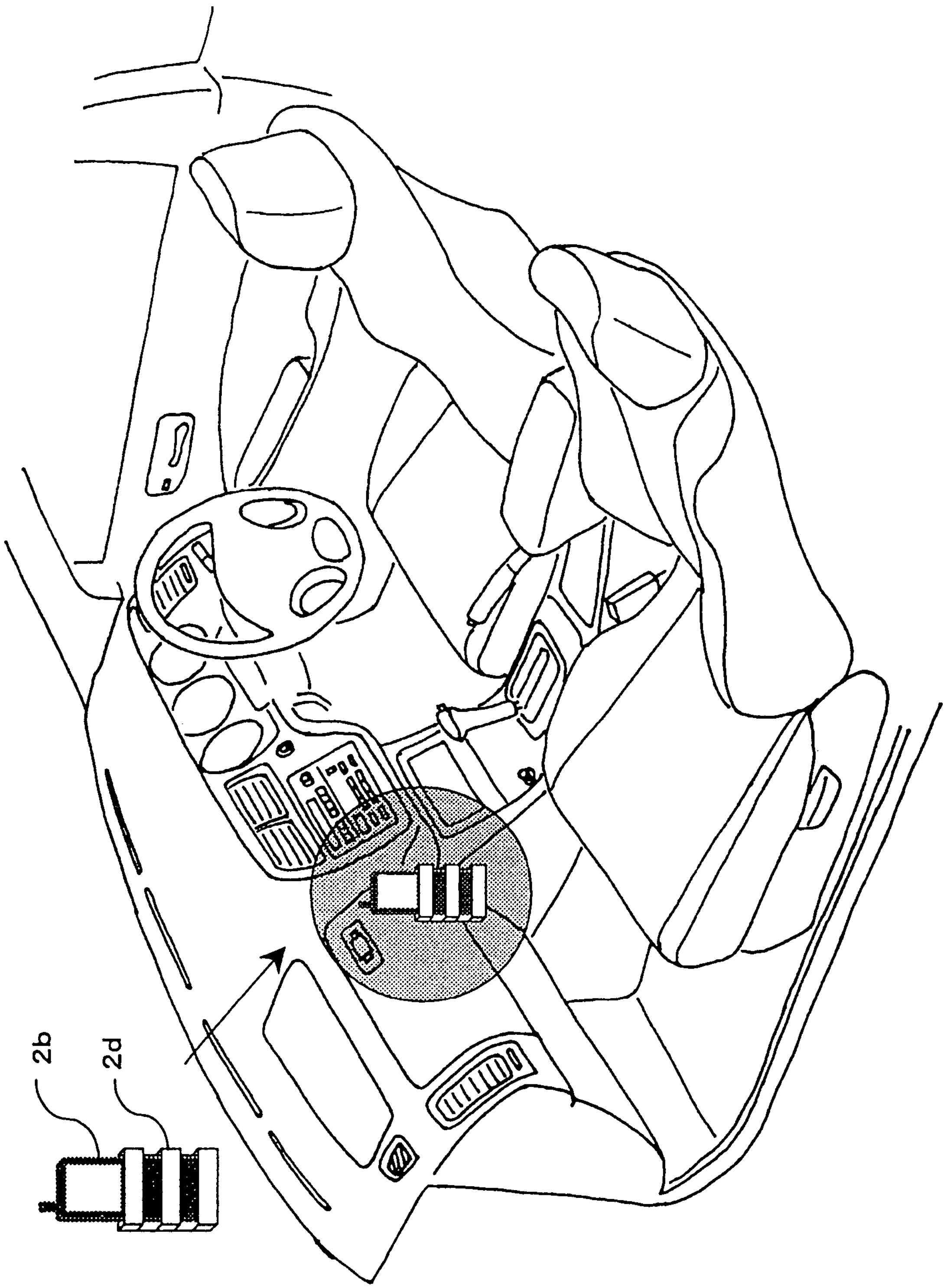
FIG. 9 is a perspective view showing an arrangement according to Embodiment 8 of the invention.

FIG. 9 is a perspective view showing an arrangement according to Embodiment 8 of the invention. Numeral 2*d* is a cellular phone holder arranged at the place indicated by the arrow. FIG. 9 shows Example 6 of the aspect of arranging the two-way transmission antenna 9*a* for short-range radio communication of the car navigation unit 8*a* outside the car navigation unit 8*a*. In this Example 6 showing the aspect of arranging the two-way transmission antenna 9*a* for short-range radio communication, the antenna 9*a* is arranged in the vicinity of the cellular phone holder in the car room (the portion indicated by half-tone dot meshing in FIG. 9). As a result, the antenna 9*a* is located in the vicinity of the cellular phone brought into the vehicle, thereby reliability on transmitting and receiving in radio communication being improved.

Consequently, in the case that the car navigation unit 8*a* is arranged either at a point a (center console) or at a point b (under the front seat) in the vehicle, particularly at the point a (the center console), the distance between the two-way transmission antenna 9*a* for short-range radio communication and the car navigation unit 8*a* is shorter than that in the foregoing Embodiment 3, 4 or 6, and loss caused by the cable length is reduced. Further, mounting the two-way transmission antenna 9*a* for short-range radio communication is easier than in the foregoing Embodiment 3 or 4.

Embodiment 9.

Figure 10:
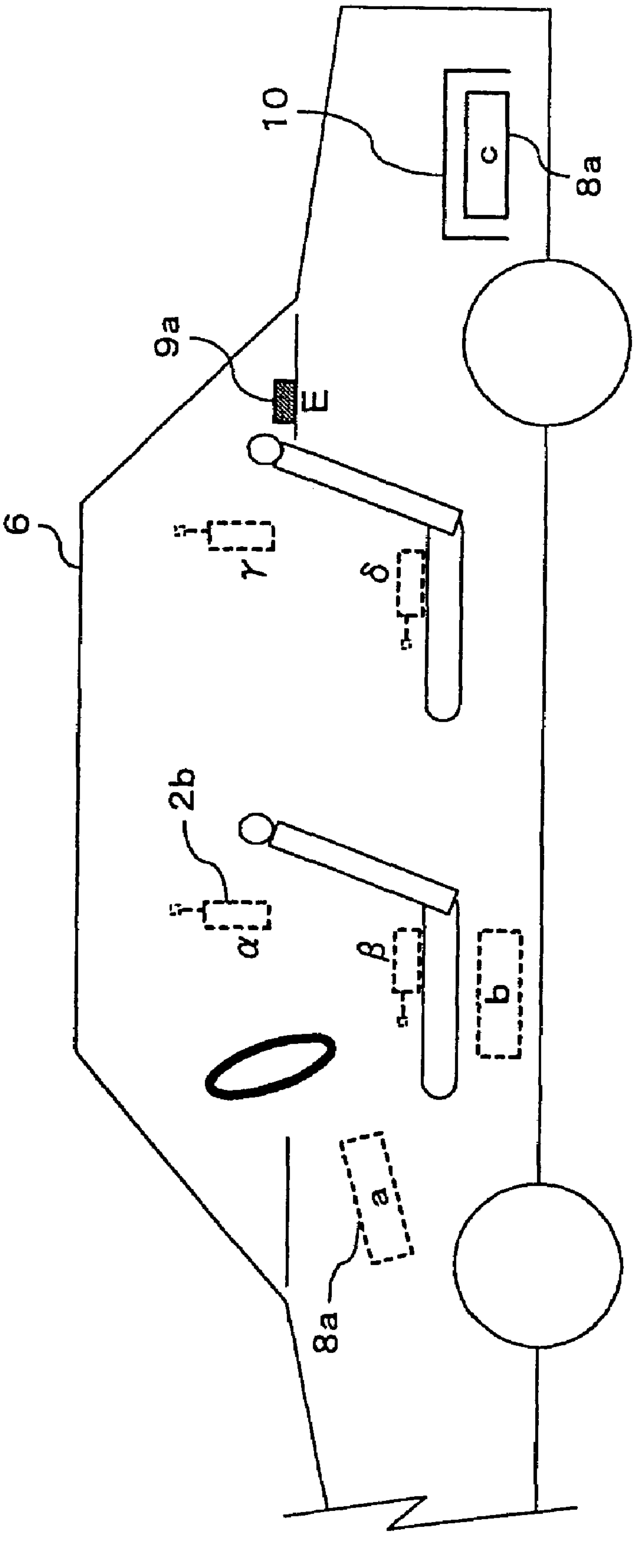
FIG. 10 is a schematic view showing an arrangement according to Embodiment 9 of the invention.

FIG. 10 is a schematic view showing an arrangement according to Embodiment 9 of the invention. FIG. 10 shows Example 7 of the aspect of arranging the two-way transmission antenna 9*a* for short-range radio communication of the car navigation unit 8*a* outside the car navigation unit 8*a*. In this Example 7 of the aspect of arranging the two-way transmission antenna 9*a* for short-range radio communication, the antenna 9*a* is arranged on a surface of a rear tray in the car room, inside the rear tray or around the rear tray (Place E). As a result, in the case that the car navigation unit 8*a* is arranged at a point c in the vehicle, the distance between the two-way transmission antenna 9*a* for short-range radio communication and the car navigation unit 8*a* is shorter than in Embodiment 3 or 4, and the loss caused by the cable length is reduced. Further, mounting two-way transmission antenna 9*a* for short-range radio communication is easier than in the foregoing Embodiment 3 or 4.

Furthermore, arranging the cellular phone 2*b* either at the point α or at the point β does not cause any significant deterioration in radio environment between the two-way transmission antenna 9*a* for short-range radio communication and the cellular phone 2*b*.

Embodiment 10.

Figure 11:
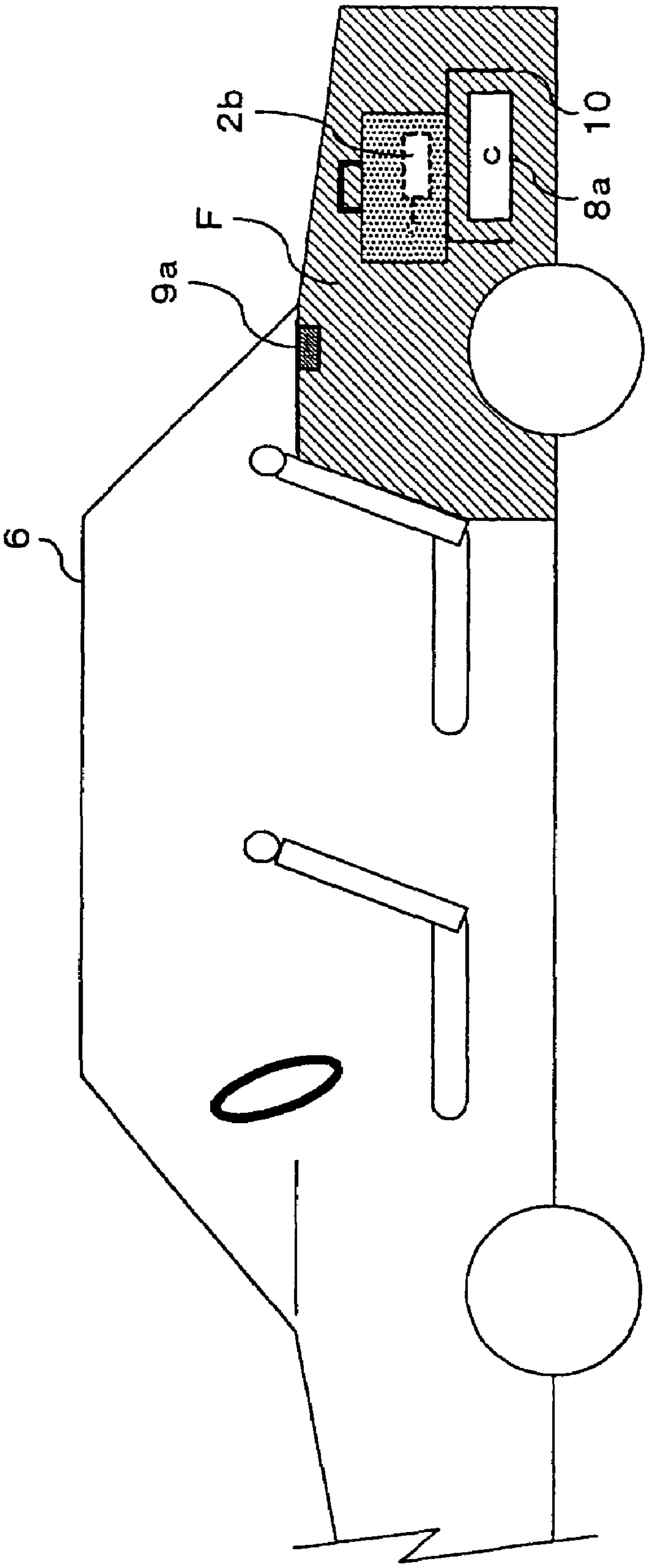
FIG. 11 is a schematic view showing an arrangement according to Embodiment 10 of the invention.

FIG. 11 is a schematic view showing an arrangement according to Embodiment 10 of the invention. FIG. 11 shows Example 8 of the aspect of arranging the two-way transmission antenna 9*a* for short-range radio communication of the car navigation unit 8*a* outside the car navigation unit 8*a*. In this Example 8 of the aspect of arranging the two-way transmission antenna 9*a* for short-range radio communication, the antenna 9*a* is arranged in the trunk of the vehicle. (i.e., Place F: the two-way transmission antenna 9*a* for short-range radio communication is arranged on the rear side of the rear tray in FIG. 11). As a result, in the case that the cellular phone is arranged in a bag accommodated in the trunk, the antenna 9*a* is located in the vicinity of the cellular phone, thereby reliability on transmitting and receiving in radio communication being improved.

Further, in the case that the car navigation unit 8*a* is arranged in the trunk as shown in FIG. 11, the distance between the car navigation unit 8*a* and the two-way transmission antenna 9*a* for short-range radio communication becomes shorter. Thus, loss caused by the antenna cable is reduced, thereby efficiency in mounting work being improved. When the driver makes hands-free telephone talk using the cellular phone, it is obvious that the hands-free telephone talk is achieved just by connecting the microphone for the driver arranged in the vicinity of the driver's seat and the speaker for reproducing the voice of the person on the other end of the line to the car navigation unit 8*a* arranged in the trunk.

Embodiment 11.

Figure 12:
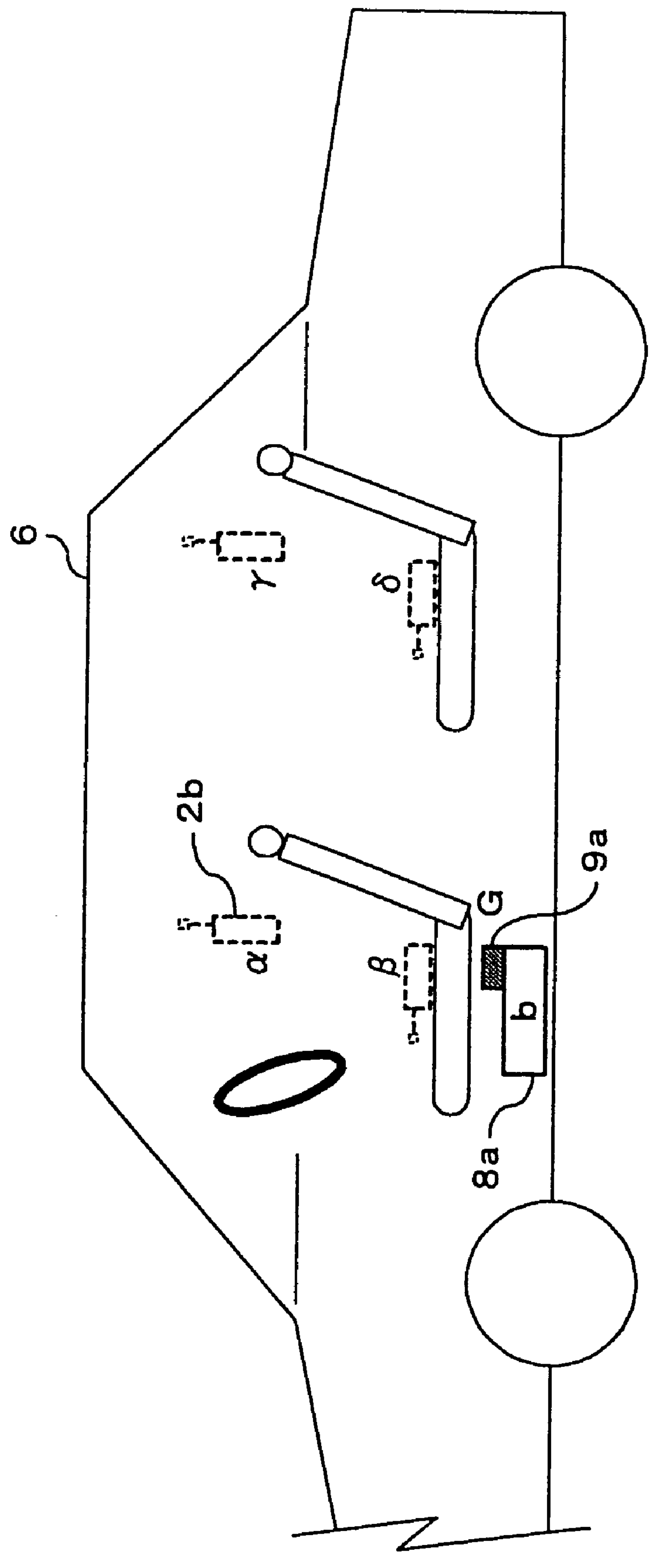
FIG. 12 is schematic view showing an arrangement according to Embodiment 11 of the invention.

FIG. 12 is a schematic view showing an arrangement according to Embodiment 11 of the invention. FIG. 12 shows Example 9 of the aspect of arranging the two-way transmission antenna 9*a* for short-range radio communication of the car navigation unit 8*a* outside the car navigation unit 8*a*. In this Example 9 of the aspect of arranging the two-way transmission antenna 9*a* for short-range radio communication, the antenna 9*a* is arranged on the outer circumference of the car navigation unit 8*a* (Place G). In this Embodiment 11, the car navigation unit 8*a* body is arranged under the front seat. As a result, the distance between the two-way transmission antenna 9*a* for short-range radio communication and the car navigation unit 8*a* becomes extremely short, loss caused by the cable length is extremely small, and mounting work is easy.

Furthermore, even in the case that the cellular phone 2*b* is arranged at any of the points α, β, γ and δ, the radio environment between the two-way transmission antenna 9*a* for short-range radio communication and the cellular phone 2*b* is improved as compared with the panel portion of built-in antenna type described in the foregoing Embodiment 1.

Embodiment 12.

Figure 13:
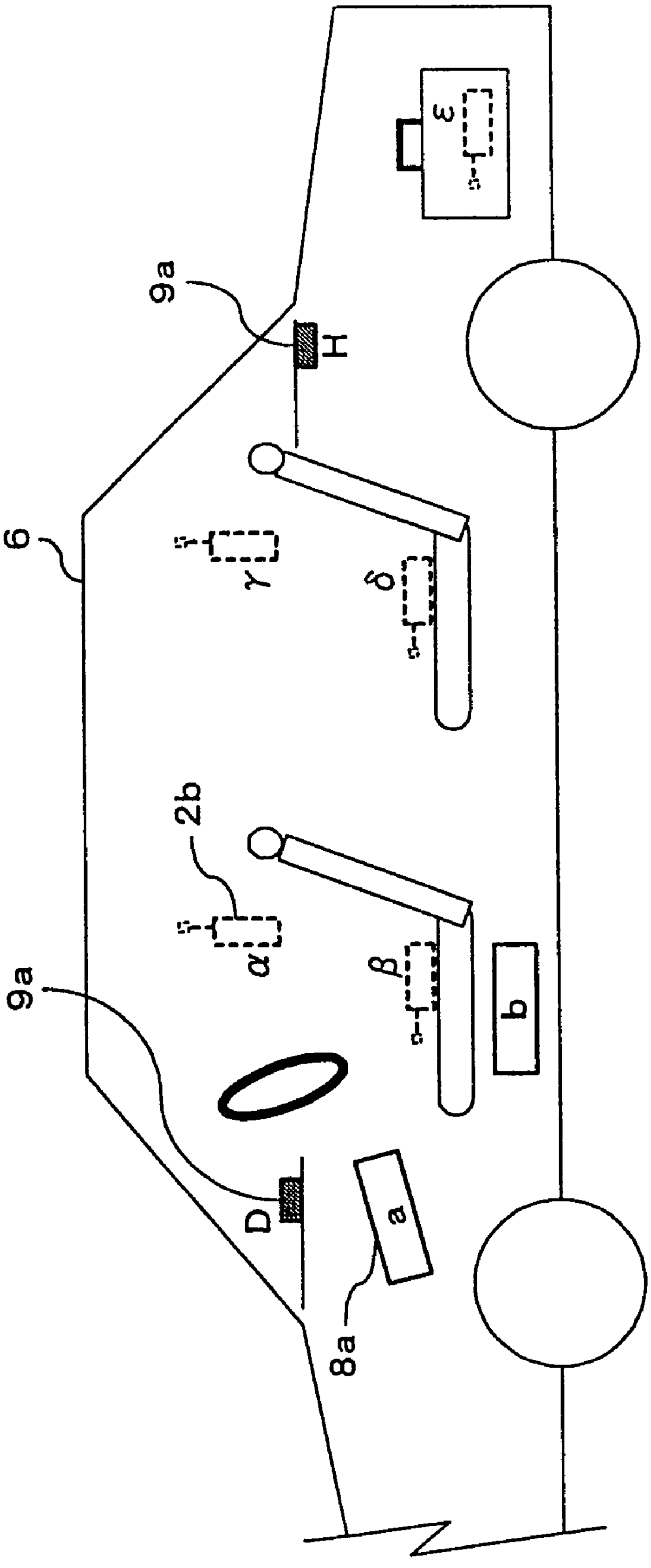
FIG. 13 is a schematic view showing an arrangement according to Embodiment 12 of the invention.

FIG. 13 is a schematic view showing an arrangement according to Embodiment 12 of the invention. FIG. 13 shows Example 10 of the aspect of arranging the two-way transmission antennas 9*a* for short-range radio communication of the car navigation unit 8*a* outside the car navigation unit 8*a*. In this Example 10 of the aspect of arranging the two-way transmission antennas 9*a* for short-range radio communication, plural two-way transmission antennas 9*a* for short-range radio communication are arranged (at Places D and H). In the drawing, Place D is located on the dashboard described in Embodiment 6, and Place H is located on the rear side of the rear tray described in Embodiment 9.

As a result, in the case that the cellular phone 2*b* is located at any of the points α, β, γ, and δ in the car room, a signal of the two-way transmission antenna 9*a* for short-range radio communication of Place D is adopted, and in the case that the cellular phone 2*b* is located at a point ε in the trunk (in a bag in this case), a signal of the two-way transmission antenna 9*a* for short-range radio communication of Place H is adopted, thus the communication-available space for the cellular phone 2*b* becomes large. This further increases reliability on the communication-available area. This Embodiment 12 is particularly effective when the short-range radio communication system is built in a large-sized vehicle.

In the foregoing description, the plural two-way transmission antennas 9*a* for short-range radio communication are arranged, and the antennas 9*a* are arranged at the front and the rear sides of the vehicle. As another Example 1 of arranging the plural two-way transmission antennas 9*a* for short-range radio communication, it is preferable that at least one of the plural two-way transmission antennas 9*a* for short-range radio communication is arranged on the right side of the longitudinal center line of the vehicle, and at least another one of them is arranged on the left side of the longitudinal center line of the vehicle. As a result of employing such an arrangement, it is possible to reduce influence of any obstacle that shuts out in the longitudinal direction of the vehicle such as backrest of seat or human body in the vehicle.

As a further Example 2 of arranging the plural two-way transmission antennas 9*a* for short-range radio communication, it is preferable that at least one of the plural two-way transmission antennas 9*a* for short-range radio communication is arranged on the right side of the seating center line of the driver's seat, and at least another one of them is arranged on the left side of the seating center line of the driver's seat. As a result of employing such an arrangement, it is possible to greatly reduce influence of the human body of the driver who uses most frequently the system of the invention such as hands-free telephone talk system. The mentioned two-way transmission antennas 9*a* for short-range radio communication arranged in this manner does not cause any significant deterioration in short-range radio communication environment at any other place than the driver's seat.

As a further Example 3 of arranging the plural two-way transmission antennas 9*a* for short-range radio communication, it is preferable that at least one of the plural two-way transmission antennas 9*a* for short-range radio communication is arranged on the front side of the seating center line of the driver's seat, and at least another one of them is arranged on the rear side of the seating center line of the driver's seat. As a result of employing such an arrangement, it is possible to greatly reduce influence of the human body of the driver who uses most frequently the system of the invention such as hands-free telephone talk system. The two-way transmission antennas 9*a* for short-range radio communication arranged in this manner does not cause any significant deterioration in short-range radio communication environment even in any other place than the driver's seat.

As a further Example 4 of arranging the plural two-way transmission antennas 9*a* for short-range radio communication, it is preferable that at least one of the plural two-way transmission antennas 9*a* for short-range radio communication is "arranged at the panel portion 8*c* of the short-range on-vehicle radio communication system (the car navigation unit 8)" described in the foregoing Embodiment 1, and at least another one of them is arranged at a place away from the short-range on-vehicle radio communication system. As a result of employing such an arrangement, only one of the two-way transmission antennas 9*a* for short-range radio communication is arranged outside the short-range on-vehicle radio communication system, and therefore the mounting work is easy. The two-way transmission antennas 9*a* for short-range radio communication arranged in this manner obviously improves the short-range radio communication environment as compared with the two-way transmission antenna 9*a* for short-range radio communication arranged only at the panel portion 8*c* of the short-range on-vehicle radio communication system (the car navigation unit 8) as described in the foregoing Embodiment 1.

As a further Example 5 of arranging the plural two-way transmission antennas 9*a* for short-range radio communication, it is preferable that at least one of the plural two-way transmission antennas 9*a* for short-range radio communication is "arranged on the outer circumference of the short-range on-vehicle radio communication system (the car navigation unit 8)" described in the foregoing Embodiment 11, and at least another one of them is arranged at a place away from the short-range on-vehicle radio communication system. As a result of employing such an arrangement, only one of the two-way transmission antennas 9*a* for short-range radio communication is arranged outside the short-range on-vehicle radio communication system, and the mounting work is easy. The two-way transmission antennas 9*a* for short-range radio communication arranged in this manner obviously improves the short-range radio communication environment as compared with the two-way transmission antenna 9*a* for short-range radio communication arranged only on the outer circumference of the short-range on-vehicle radio communication system (the car navigation unit 8) as described in the foregoing Embodiment 11.

Embodiment 13

Figure 14:
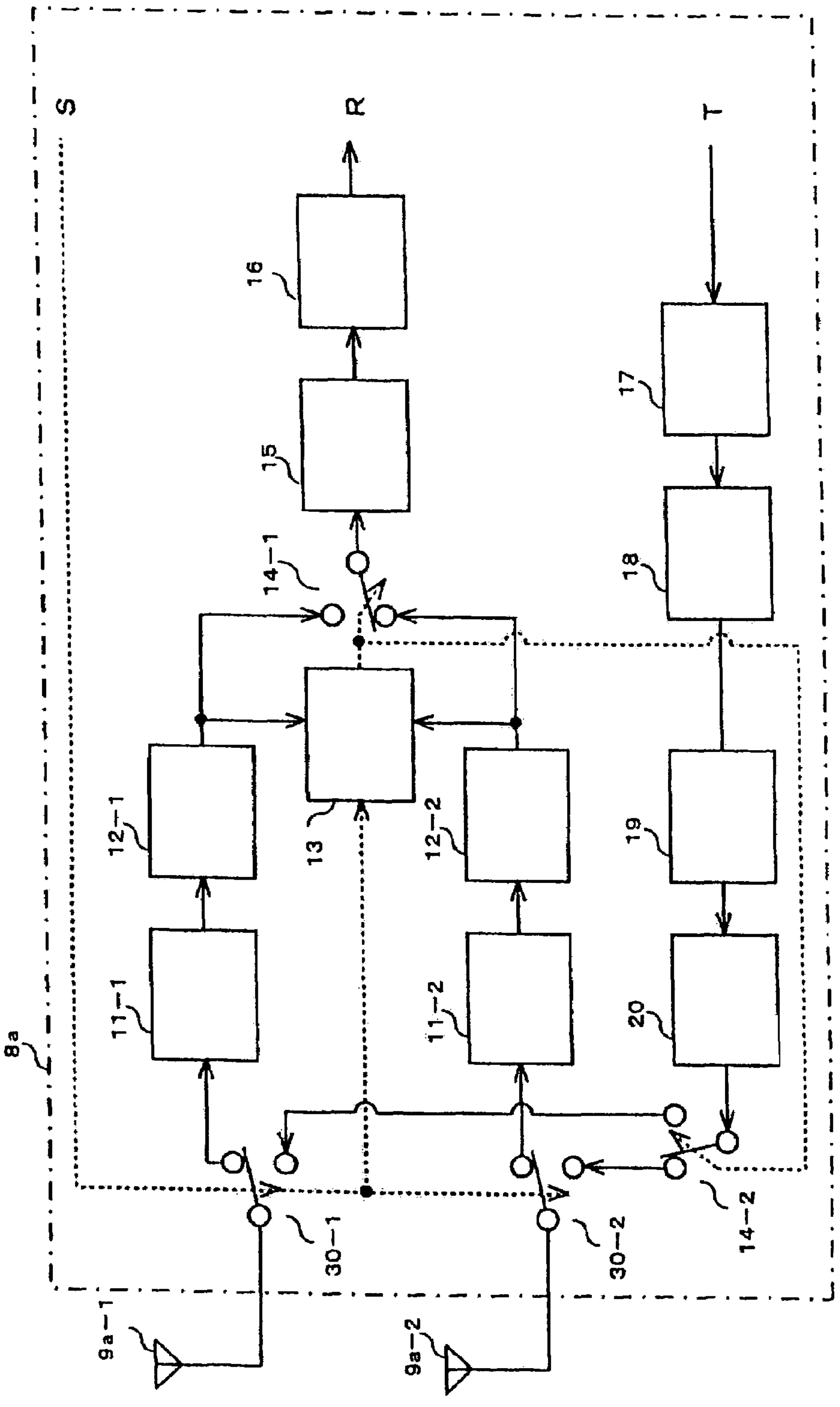
FIG. 14 is a block diagram showing Embodiment 13 of the invention, and is a block diagram of an antenna output selection circuit showing an essential part of Embodiment 12.
Figure 15:
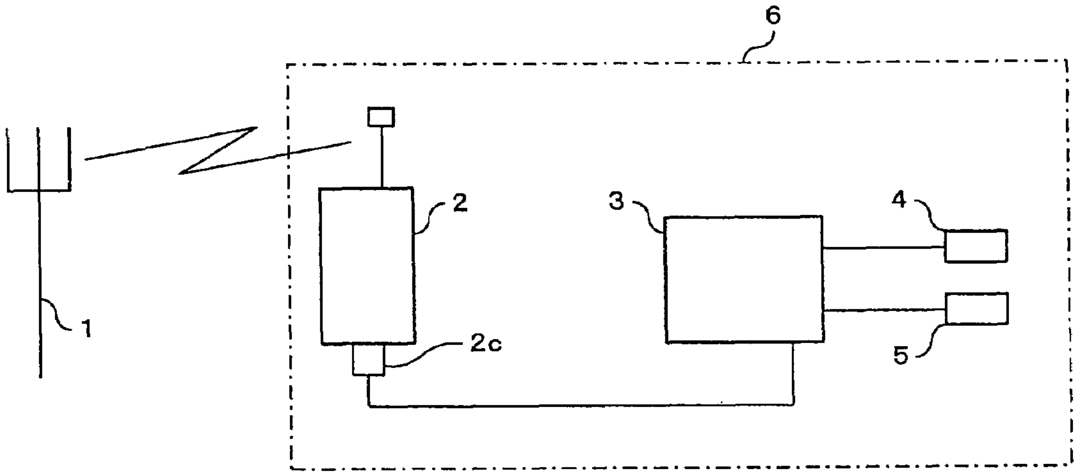
FIG. 15 is a block diagram of a conventional hands-free system.
Figure 16:
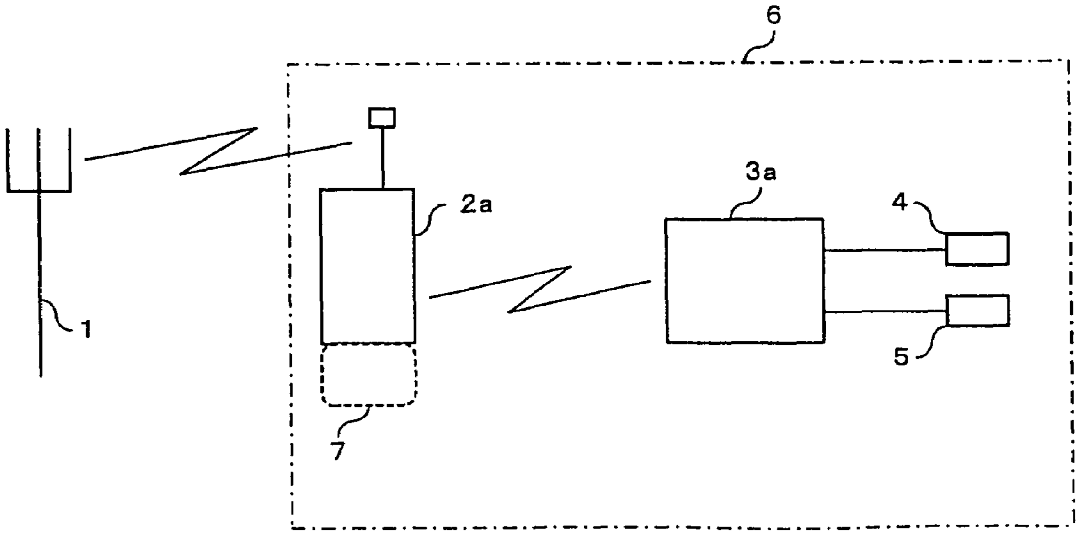
FIG. 16 is a block diagram of another conventional hands-free system.

FIG. 14 is a block diagram of an antenna output selective circuit showing an essential part of Embodiment 13 of the invention. This Embodiment 13 is an example in which two two-way transmission antennas for radio communication are used, and in which connection is made to the radio communication two-way transmission antenna output of which reception level is higher. In FIG. 14, numeral 8*a* is the car navigation unit having a radio communication function, and numerals 9*a*-1 and 9*a*-2 are the two-way transmission antennas for radio communication arranged outside the body of the car navigation unit 8*a*. Numerals 30-1 and 30-2 are duplexers for switching whether to receive reception signals from the two-way transmission antennas 9*a*-1 and. 9*a*-2 for radio communication or transmit transmission signals to the two-way transmission antennas 9*a*-1 and 9*a*-2 for radio communication. Numerals 11-1 and 11-2 are band-pass filters for passing frequency bands of the reception signals received by the two-way transmission antennas 9*a*-1 and 9*a*-2 for radio communication. Numerals 12-1 and 12-2 are low-noise amplifiers for amplifying the reception signals that have passed through the band-pass filters 11-1 and 11-2. Numeral 13 is a level comparator for comparing a level of the reception signal of the two-way transmission antenna 9*a*-1 for radio communication and a level of the reception signal of the two-way transmission antenna 9*a*-2 for radio communication, and numerals 14-1 and 14-2 are antenna switches for switching the connection to either of the two-way transmission antennas 9*a*-1 and 9*a*-2 for radio communication. Numeral 15 is an A/D converter for converting a received analog signal into a digital signal, and numeral 16 is a demodulation circuit for demodulating the reception signal converted into the digital signal and outputting the reception signal R. Numeral 17 is a modulation circuit for modulating a transmission signal T, numeral 18 is a D/A converter for converting the modulated transmission signal from a digital signal into an analog signal, numeral 19 is a band-pass filter for limiting the transmission signal converted into the analog signal to a signal of a predetermined frequency band, and numeral 20 is an amplifier for amplifying the transmission signal.

Operation is hereinafter described. The signals received by the two-way transmission antennas 9a-1 and 9a-2 for radio communication are inputted to the level comparator 13 via the duplexers 30-1 and 30-2, the band-pass filters 11-1 and 11-2, and the low-noise amplifiers 12-1 and 12-2. The level comparator 13 compares level of the two inputted signals (receiving signals), and the antenna switches 14-1 and 14-2 are controlled based on the result of the comparison. The reception signal selected by the antenna switch 14-1 passes through the A/D converter 15 and the demodulation circuit 16, and is processed by a signal processor (not shown) in a later stage.

On the other hand, a transmitting signal is inputted to the antenna switch 14-2 via the modulation circuit 17, the D/A converter 18, the band-pass filter 19, and the amplifier 20. As described above, the antenna switch 14-2 is controlled to select the two-way transmission antenna for radio communication of the higher receiving signal level. Therefore, the transmission signal is transmitted from the two-way transmission antenna for radio communication of the higher reception level.

Timing for switching from one of the duplexers 30-1 and 30-2 to the other is decided on the basis of a transmission-reception switch signal S to prevent a signal from missing at the moment of switching. Further, timing for switching from one of the antenna switches 14-1 and 14-2 for selecting either of the two two-way transmission antennas for radio communication to the other switch is also decided on the basis of the transmission-reception switch signal S inputted to the level comparator 13.

INDUSTRIAL APPLICABILITY

The present invention is applicable to installation of a short-range on-vehicle radio communication system having in-car radio communication function in a large-sized vehicle such as bus or train, a passenger car, or a commercial car.

What is claimed is:

1. A short-range on-vehicle radio communication system having an in-car radio communication function, comprising:

a car navigation unit having a main body including a sheet metal chassis portion and a panel portion attached directly to the sheet metal chassis portion;

at least a first and a second two-way transmission antenna for short range radio communication, each antenna being connected with the main body by an antenna cable, each antenna being able to receive and to transmit radio communication signals and each antenna being arranged inside the vehicle and outside the sheet metal chassis of the main body of the radio communication system, wherein the first two-way transmission antenna is arranged in the interior car room and the second two-way transmission antenna is arranged in the trunk of the vehicle;

at least one mobile phone, the mobile phone communicating with the car navigation unit by using one of the first and second two-way transmission antennas, where signals transmitted and received from outside the vehicle are transmitted to and received from the at least one mobile phone via the car navigation unit;

wherein an antenna output of the highest reception level is selected from the at least first and second two-way transmission antennas for radio communication;

at least one microphone connected to said main body used to obtain signals from within the interior of the vehicle; and at least one speaker connected to said main body used to reproduce signals received at said main body, within the interior of the vehicle.

2. The short-range on-vehicle radio communication system according to claim 1, wherein the short-range on-vehicle radio communication system is a car vehicle navigation unit, and the first two-way transmission antenna for radio communication is arranged at the panel portion outside the sheet metal chassis of the vehicle navigation unit.

3. The short-range on-vehicle radio communication system according to claim 1, wherein the first two-way transmission antenna for radio communication is arranged outside the main body.

4. The short-range on-vehicle radio communication system according to claim 3, wherein the first two-way transmission antenna for radio communication is arranged at a ceiling of the vehicle.

5. The short-range on-vehicle radio communication system according to claim 4, wherein the first two-way transmission antenna for radio communication is arranged in an interior light module on the ceiling of the vehicle, on a surface of the module or around the module.

6. The short-range on-vehicle radio communication system according to claim 3, wherein the first two-way transmission antenna for radio communication is arranged on a surface of a rear tray in the vehicle, inside the rear tray or around the rear tray.

7. The short-range on-vehicle radio communication system according to claim 3, wherein the first two-way transmission antenna for radio communication is arranged on an outer circumference of the main body.

8. The short-range on-vehicle radio communication system according to claim 1, wherein the first two-way transmission antenna for radio communication is arranged on a front seat side in the vehicle.

9. The short-range on-vehicle radio communication system according to claim 8, wherein the first two-way transmission antenna for radio communication is arranged on a surface of a dashboard in the vehicle, inside the dashboard or around the dashboard.

10. The short-range on-vehicle radio communication system according to claim 8, wherein the first two-way transmission antenna for radio communication is arranged on a surface of either a center console or a floor console in the vehicle, inside the console or around the console.

11. The short-range on-vehicle radio communication system according to claim 8, wherein the first two-way transmission antenna for radio communication is arranged in the vicinity of a cellular phone holder in the vehicle.

* * * * *